United States Patent [19]

Takahashi

[11] Patent Number: 5,762,280
[45] Date of Patent: Jun. 9, 1998

[54] DOUBLE-BEARING FISHING REEL WITH FINGER PLACING ELEMENT

[75] Inventor: Hideaki Takahashi, Tokyo, Japan

[73] Assignee: Daiwa Seiko Inc., Tokyo, Japan

[21] Appl. No.: 803,910

[22] Filed: Feb. 21, 1997

Related U.S. Application Data

[63] Continuation of Ser. No. 509,576, Jul. 31, 1995, abandoned.

[30] Foreign Application Priority Data

| Aug. 5, 1994 | [JP] | Japan | 6-010664 U |
| Aug. 5, 1994 | [JP] | Japan | 6-010665 U |

[51] Int. Cl.⁶ ............................................. A01K 89/15
[52] U.S. Cl. ...................................................... 242/310
[58] Field of Search ............................ 242/310, 261, 242/260

[56] References Cited

U.S. PATENT DOCUMENTS

| 1,469,649 | 10/1923 | Sinkula et al. | 242/310 X |
| 4,666,101 | 5/1987 | Atobe | 242/310 X |
| 4,821,978 | 4/1989 | Kaneko | 242/310 |
| 4,943,012 | 7/1990 | Aoki | 242/310 X |
| 5,108,042 | 4/1992 | Puryear et al. | 242/310 X |
| 5,183,221 | 2/1993 | Kawai et al. | 242/310 |
| 5,188,312 | 2/1993 | Sato | 242/261 |
| 5,228,369 | 7/1993 | Sato | 242/310 X |

FOREIGN PATENT DOCUMENTS

| 56-160478 | 4/1955 | Japan. |
| 59-68077 | 5/1984 | Japan. |

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

A double-bearing type fishing reel with which the thumb of the hand holding the reel can be readily placed on a finger placing member, and a thumbing operation can be smoothly achieved by moving the thumb. In the fishing reel, a finger placing member is mounted on a reel body in such a manner that it is located behind a spool supported between two side boards of the reel body. The finger placing surface of the finger placing member is gradually larger in width toward one the side boards from the other, so that, with the thumb of the hand holding the reel body placed on the part of the finger placing surface which is larger in width, the reel is stably held, and the thumbing operation with the tip of the thumb is smoothly achieved by the natural movement of the thumb over the part of the finger placing surface which is smaller in width.

10 Claims, 6 Drawing Sheets

DOUBLE-BEARING FISHING REEL WITH FINGER PLACING ELEMENT

This is a Continuation of application Ser. No. 08/509,576 filed Jul. 31, 1995, now abandoned.

BACKGROUND OF THE INVENTION

This invention relates to a fishing double-bearing type reel.

A fishing double-bearing type reel has a finger placing member which is provided between the side boards of the reel body in such a manner that it is located behind its spool, as disclosed in Japanese Utility Model Kokai Publications Sho. 56-160478 and Sho. 59-68077. The finger placing member is to allow the fisherman readily to hold the reel and to ease the thumbing operation for the spool.

However, the conventional double-bearing type fishing reel suffers from the following difficulty, that is, in the conventional reel, the finger placing surface of the finger placing member is constant both in width and in height. Hence, the thumbing operation with the thumb cannot be smoothly started. In addition, the conventional reel cannot cope with the personal differences among fishermen such as the difference in size of hand holding the reel and the difference in thumbing habit.

The thumbing operation is carried out as follows: The thumb of the hand holding the reel is held placed on the finger placing member. Under this condition, the thumb is moved (swung) towards the palm with its tip protruding towards the spool. However, depending on the size of the hand of the fisherman, or his reel gripping habit, or his thumbing habit, it is difficult for him to stably hold the thumb at the suitable operating position because the conventional finger placing surface is constant in width. In addition, in the thumbing operation, the finger placing member may obstruct the movement of the thumb, thus making it impossible for him to smoothly grip the reel and to perform the thumbing operation. Furthermore, since the conventional finger placing surface is constant in height, the fisherman faces difficult in suitably positioning the tip of the thumb in accordance with the amount of the windings on the spool. That is, the conventional reel is lowered in operability when the fishing line on the spool is being changed in diameter.

SUMMARY OF THE INVENTION

In view of the foregoing, an object of the invention is to provide a double-bearing type fishing reel which is improved in reel gripping characteristics and in thumbing operation, coping with the personal differences among fishermen. Another object of the present invention is to provide a double-bearing type fishing reel which allows a fisherman to readily change the height position of the tip of the thumb placed on a finger placing member in accordance with the amount of the fishing line wound on the spool, to thereby enable smooth and comfortable thumbing operation.

The foregoing object of the invention has been achieved by the provision of a double-bearing type fishing reel in which a finger placing member is mounted on a reel body in such a manner as to be located behind a spool supported between two side boards of the reel body; in which, according to the invention, the finger placing member has a finger placing surface which is gradually larger in width and/or height towards one end thereof.

The finger placing surface may be gradually larger in width and/or height towards one of the side boards which has a handle from the other side board having no handle; or it may be gradually larger in width and/or height towards the other side board from the one side board. In addition, the finger placing surface may be so designed that it is gradually larger both in height and in width towards one end thereof; or it is gradually smaller in height and gradually larger in width towards the one end thereof. Further, the finger placing surface of the finger placing member may be formed as a planar slope surface or as a curved, gentle slope surface.

The thumb of the hand holding the fishing reel, being extended outwardly, is placed on the part of the finger placing surface which is larger in width, to stably hold the fishing reel. In the thumbing operation, the thumb is moved along the finger placing surface towards the end smallest in width, thus protruding over the finger placing surface, to perform the thumbing operation for the spool. With the fishing reel in which the finger placing surface is gradually larger in height toward one end thereof, the thumbing operation can be smoothly carried out with the tip of the thumb placed on the part of the finger placing surface which corresponds in height with the fishing line winding diameter on the spool. The thumb is moved toward the lower side or higher side along the finger placing surface depending on the change in the fishing line winding diameter on the spool, so that the thumbing operation is carried out at the best height position.

DETAILED DESCRIPTION OF THE PREFERRED EMBODIMENTS

Preferred embodiments of the invention will be described with reference to the accompanying drawings.

Figure 1:
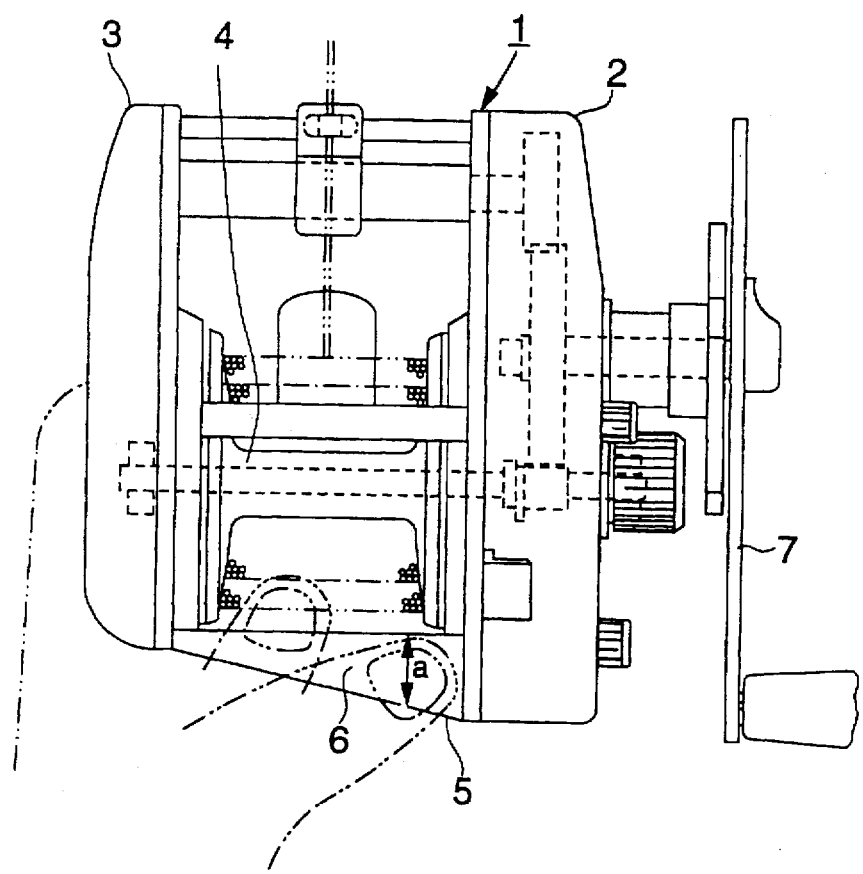
FIGS. 1 and 2 are a plan view and a front view, respectively, showing an example of a double-bearing type fishing reel, which constitutes a first embodiment of the invention.
Figure 2:
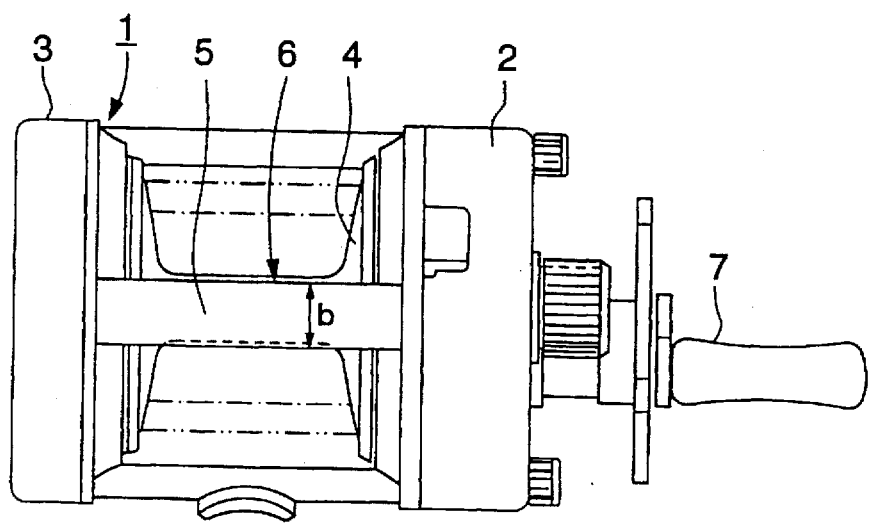

FIGS. 1 and 2 show an example of a double-bearing type fishing reel, which constitutes a first embodiment of the invention. In the fishing reel, as is well known in the art, a spool 4 is supported between the side boards 2 and 3 of a reel body 1, and a finger placing member 5 is provided behind the spool 4 and between the side boards 2 and 3. The finger placing member 5 has a finger placing surface 6 whose width a is gradually increased towards its one end; i.e., towards the side board 2 having a handle 7 from the side board 3 having no handle. When the fishing reel is held with the hand spreading over the side board 3, the thumb of the hand is placed on the portion of the finger placing surface 6 which is larger in width a. And in a thumbing operation, the thumb is moved along the finger placing surface so that its tip is protruded over the portion of the finger placing surface 6 which is smaller in width a, to thumb the fishing line winding section of the spool 4.

Figure 3:
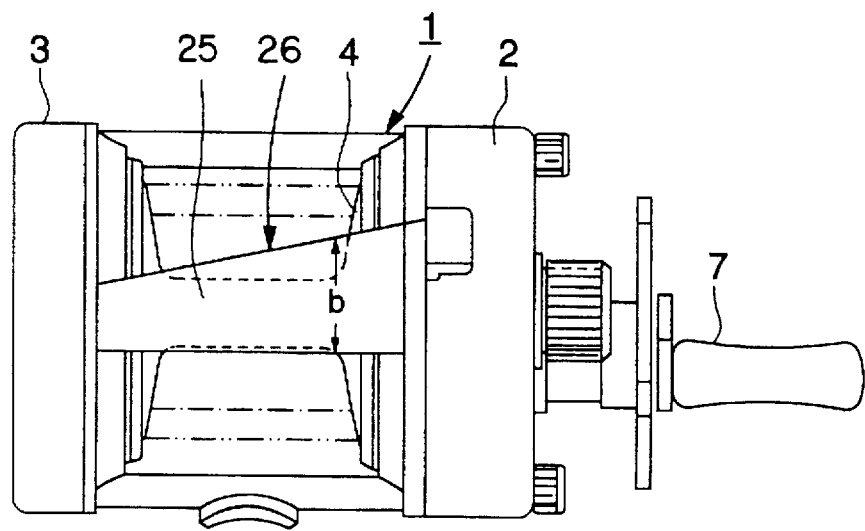
FIG. 3 is a front view showing another example of the double-bearing type fishing reel, which constitutes a second embodiment of the invention.

FIG. 3 shows another example of the double-bearing type fishing reel, which constitutes a second embodiment of the invention. In the first embodiment, the finger placing surface 6 is constant in height b. On the other hand, in the second embodiment, the finger placing surface 26 on finger placing member 25 is larger in height b towards the side board 2 having the handle while it is larger also in width a towards the side board 2. Hence, in addition to the effect of the first embodiment, the second embodiment has the following effect: The portion of the finger placing surface 26 which is larger in height b may be suitably used for thumbing the part of the spool 4 which is larger in winding diameter, and the portion of the finger placing surface which is smaller in height b may be suitably used for thumbing the part of the spool 4 which is smaller in winding diameter.

Figure 4:
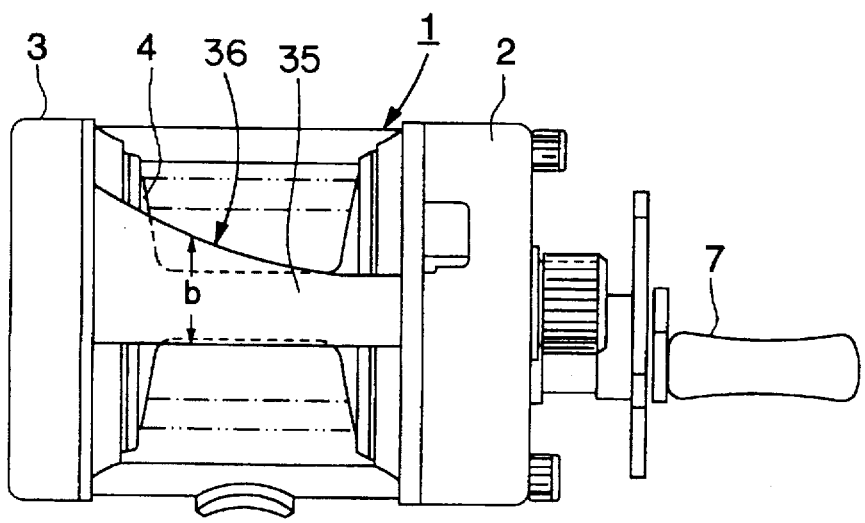
FIG. 4 is a front view showing another example of the double-bearing type fishing reel, which constitutes a third embodiment of the invention.

FIG. 4 shows another example of the double-bearing type fishing reel, which constitutes a third embodiment of the invention. In the third embodiment, the finger placing surface 36 on the member 35 is smaller in height b towards the side board 2 having the handle while it is larger in width a towards the side board 2. In addition, the finger placing surface 36 is gradually downwardly curved.

Figure 5:
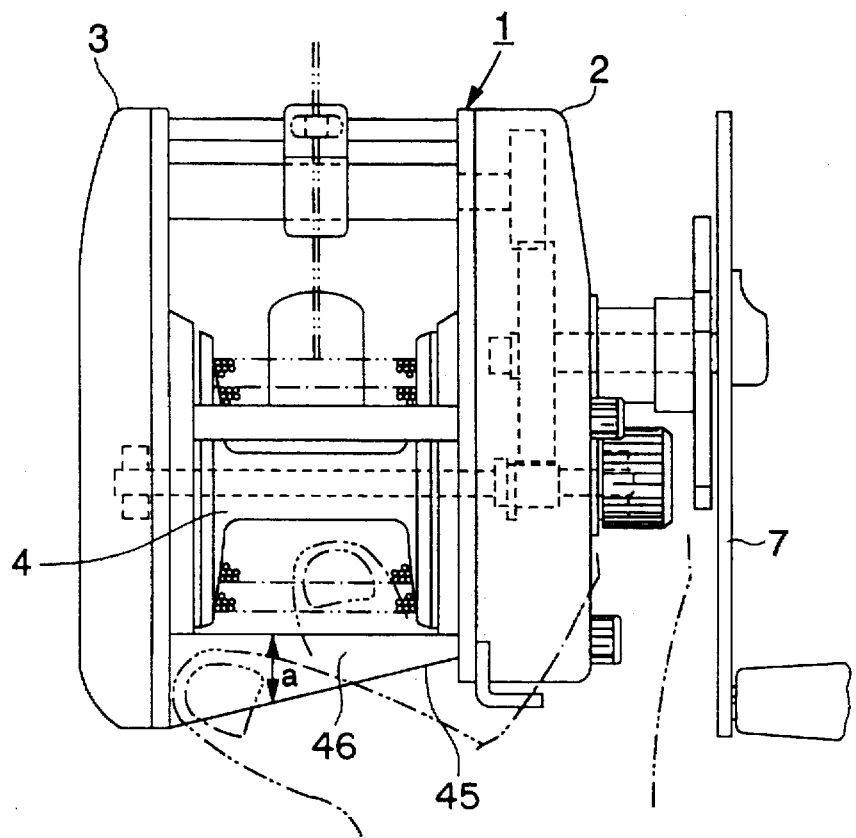
FIGS. 5 and 6 are a plan view and a front view, respectively, showing another example of the double-bearing type fishing reel, which constitutes a fourth embodiment of the invention.
Figure 6:
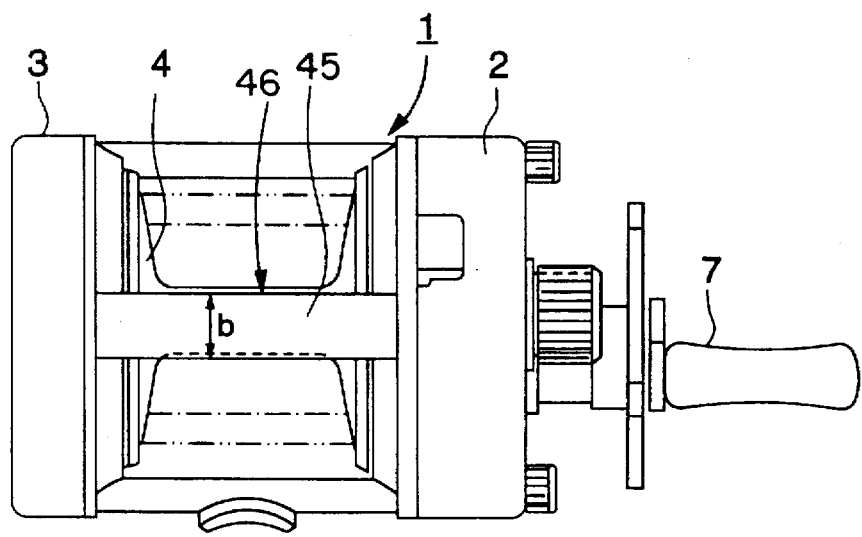

FIGS. 5 and 6 shows another example of the double-bearing type fishing reel, which constitutes a fourth embodiment of the invention. In the fourth embodiment, the finger placing surface 46 on the member 45 is larger in width a towards the side board 3 having no handle. The fishing reel is suitable for a fisherman who holds it with the hand spreading over the side board 2 having the handle 7.

Figure 7:
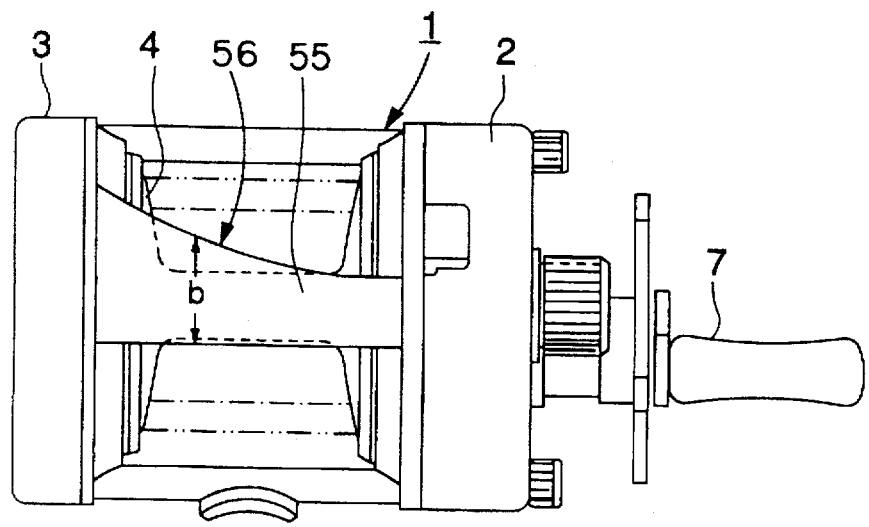
FIG. 7 is a front view showing another example of the double-bearing type fishing reel, which constitutes a fifth embodiment of the invention.

FIG. 7 shows another example of the double-bearing type fishing reel, which constitutes a fifth embodiment of the invention. The fifth embodiment may be obtained by modifying the fourth embodiment in such a manner that the finger placing surface 56 on the member 55 is larger both in height b and in width a towards the side board 3, and it is gradually downwardly curved.

Figure 8:
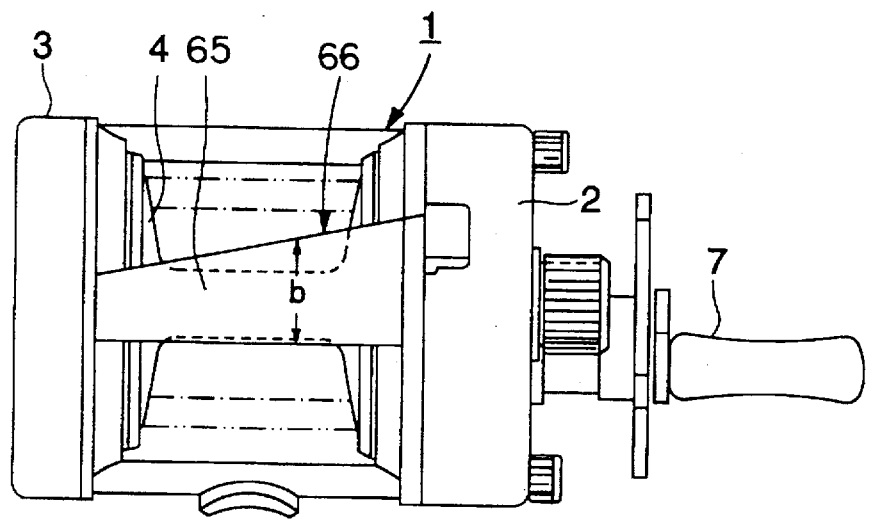
FIG. 8 is a front view showing another example of the double-bearing type fishing reel, which constitutes a sixth embodiment of the invention.

FIG. 8 shows another example of the double-bearing type fishing reel, which constitutes a sixth embodiment of the invention. The sixth embodiment is obtained by modifying the fourth embodiment so that the finger placing surface 66 on the member 65 is larger in height b towards the side board 2 having the handle 7 while it is smaller in width a towards the side board 2. Each of the fishing reels shown in FIGS. 7 and 8 is suitable for a fisherman who holds it with the hand spreading over the side board 2.

Although an end face of the finger placing member opposite from the spool in the width direction is planar in each of the first to sixth embodiments, the end face of the finger placing member may be curved.

Figure 9:
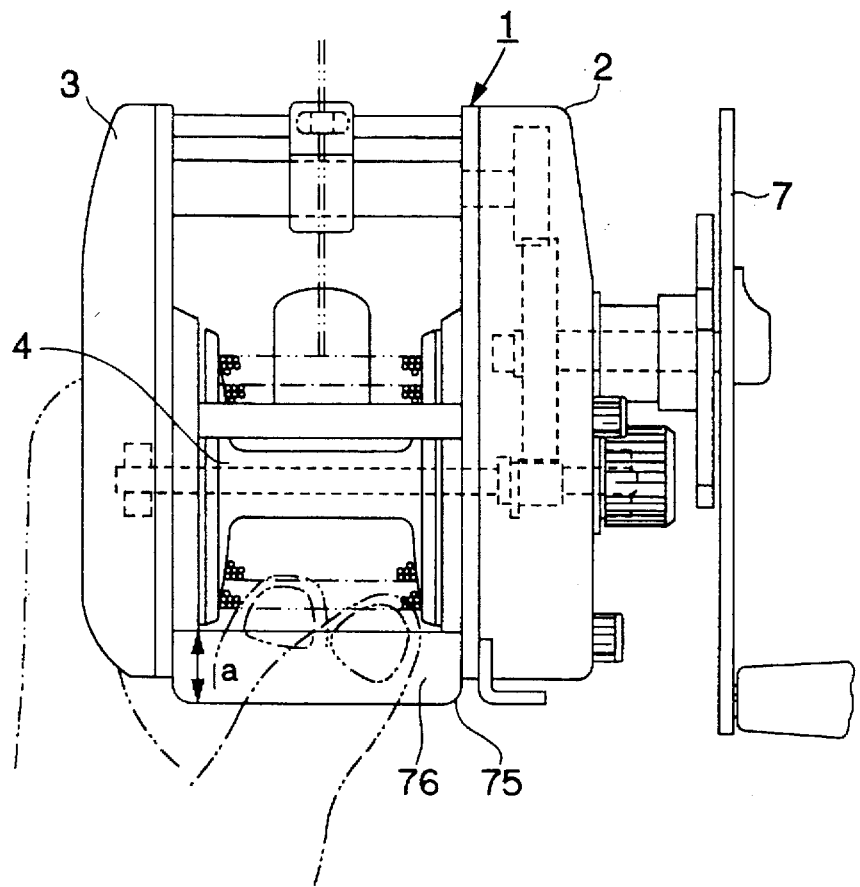
FIGS. 9 and 10 are a plan view and a front view, respectively, showing another example of the double-bearing type fishing reel, which constitutes a seventh embodiment of the invention.
Figure 10:
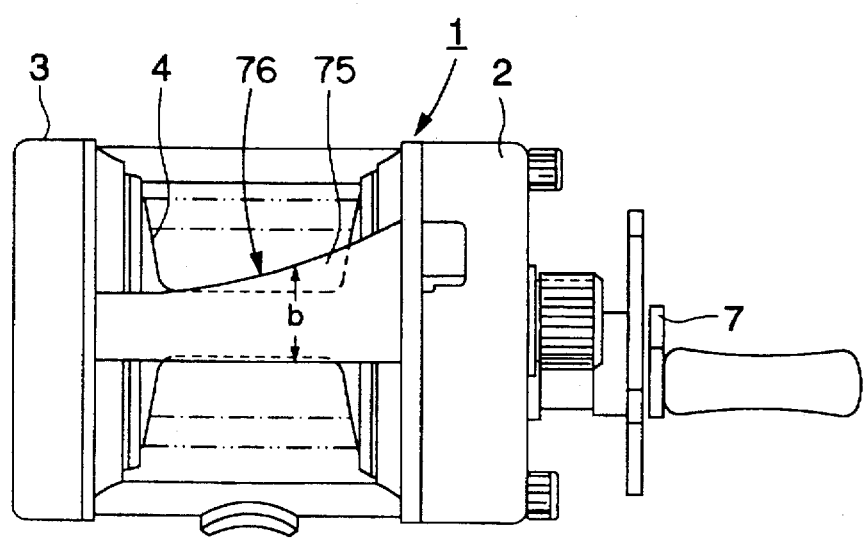

FIGS. 9 and 10 show another example of the double-bearing type fishing reel, which constitutes a seventh embodiment of the invention. In the seventh embodiment, the finger placing surface 76 on the member 75 is constant in width a while the height b is gradually increased toward the side board 2 having the handle 7 from the side board 3 having no handle. Further, the finger placing surface 76 is formed as a downwardly curved, gentle slope surface. The finger placing surface 76 is designed so that the smooth thumbing operation is carried out readily with the thumb located at the suitable height position depending on the diameter of the fishing line wound on the spool 4.

That is, in FIGS. 9 and 10, when the amount of the fishing line wound on the spool 4 is large, the thumb of the hand holding the reel is placed on the part of the finger placing surface 76 which is large in height b and the thumbing operation is carried out with the tip of the thumb as indicated by two dotted chain line, and, on the other hand, when the amount of the fishing line wound on the spool 4 is small as indicated one-dotted chain line, the thumb is moved toward the smaller height side along the finger placing surface 76 in accordance with the amount of the fishing line to perform smooth thumbing operation.

Figure 11:
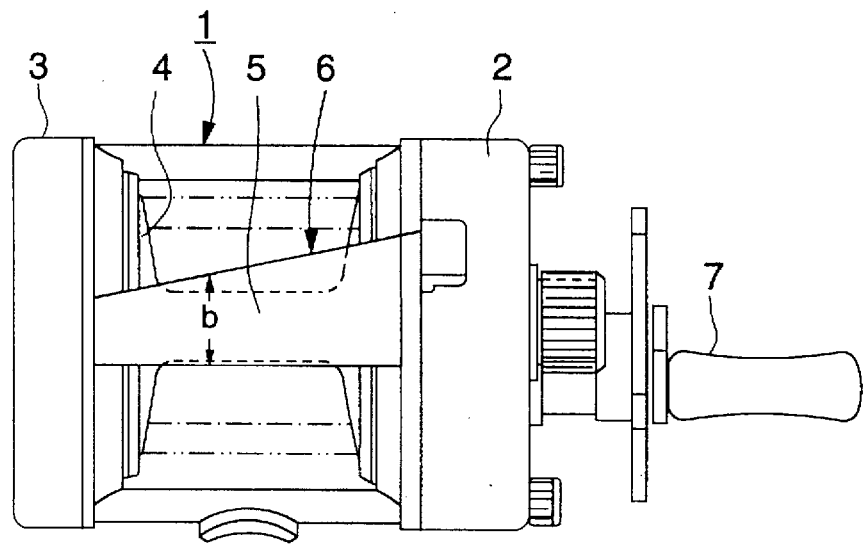
FIG. 11 is a front view showing another example of the double-bearing type fishing reel, which constitutes an eighth embodiment of the invention.

FIG. 11 shows another example of the double-bearing type fishing reel, which constitutes an eighth embodiment of the invention. In the eight embodiment, the finger-placing surface 86 on the member 85 is formed as a planar slope surface in place of the curved slope surface of the seventh embodiment. The other structure of the eighth embodiment is the same as that of the seventh embodiment.

Figure 12:
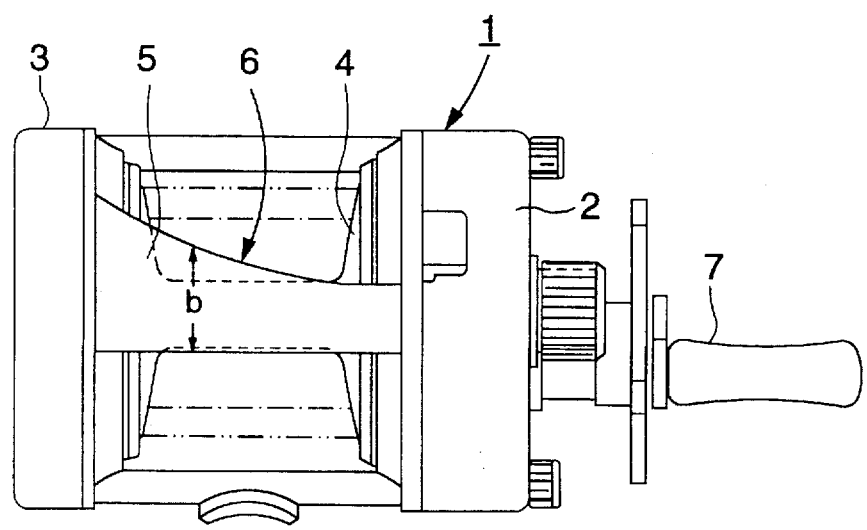
FIG. 12 is a front view showing another example of the double-bearing type fishing reel, which constitutes an ninth embodiment of the invention.

FIG. 12 shows another example of the double-bearing type fishing reel, which constitutes a ninth embodiment. In the ninth embodiment, the height b of the finger placing surface 96 on the member 95 is gradually increased toward the side board 3 having no handle from the side board 2 having the handle 7 while the finger placing surface 96 is formed as a curved slope surface. The width a of the finger placing surface 6 is constant similar to the seventh and eight embodiments.

In the fishing reel of the invention, the finger placing surface of the finger placing member located behind the spool is made gradually larger in width towards one end thereof. Hence, when the reel is held with the hand spreading over the side board where the finger placing surface is smaller in width, the thumb of the hand can be stably held on the wide part of the finger placing surface on which the thumb can be readily placed. Under this condition, the thumb can be smoothly moved to the part of the finger placing surface which is smaller in width, so that its tip is protruded for the thumbing operation. Thus, the thumbing operation can be achieved quickly and smoothly with the reel held positively. In addition, the finger placing surface, being changed in width, can sufficiently cope with the personal difference among fishermen such as the difference in the size of hands among them, and the difference in fishing habit among them.

The fishing reel of the invention in which the finger placing surface is gradually larger in width towards the side board having the handle from the side board having no handle has the following effect or merit: By holding the reel with one hand spreading over the side board having no handle, the handle can be operated with the other hand. That is, while the reel is being held and the handle is being operated, the fishing line can be continuously and smoothly let out of the reel or wound on the latter.

With the fishing reel of the invention in which the finger placing surface is gradually larger in height towards one end thereof, the thumbing operation can be smoothly carried out with the thumb placed on the part of the finger placing surface which corresponds in height with the change in diameter of the spool on which the fishing line is wound. That is, by placing the thumb on the part of the finger placing surface at suitable height position, the natural and less forcible thumbing operation can be carried out with the tip of the thumb regardless of the diameter of the fishing line wound on the spool.

The fishing reel of the invention in which the finger placing surface is gradually larger in height towards the side board having the handle from the side board having no handle has the following effect or merit: The reel is held with one hand spreading over the side board having no handle, and, under this condition, the thumbing operation can be smoothly carried out with the thumb of that one hand to deliver the fishing line out of the spool or the fishing line winding operation can be performed smoothly and readily with the other hand.

What is claimed is:

1. A double-bearing type fishing reel in which a finger placing member is mounted on a reel body with opposite ends of the finger placing member supported by two side boards of said reel body respectively, wherein said finger placing member is located away from an axis of a spool in a direction opposite a direction in which a fish line is delivered from the spool, and said finger placing member has a finger placing surface extending between the side boards for supporting a thumb for movement along said finger placing surface during a thumbing operation on the spool, said finger placing surface gradually increasing in width from one end thereof to an opposite end thereof.

2. A double-bearing type fishing reel according to claim 1, wherein said finger placing surface is gradually larger both in width and in height toward said one end.

3. A double-bearing type fishing reel according to claim 1, wherein said finger placing surface is gradually larger in width and gradually smaller in height toward said one end.

4. A double-bearing type fishing reel according to claim 1, wherein said finger placing surface is gradually larger in width toward one of said side boards, on which a handle is provided, from the other one of said side boards.

5. A double-bearing type fishing reel according to claim 1, wherein said finger placing surface is gradually larger in width from one of said side boards, on which a handle is provided, toward the other one of said side boards.

6. A double-bearing type fishing reel in which a finger placing member is mounted on the reel body with opposite ends of the finger placing member supported by two side boards of said reel body respectively, wherein said finger placing member is located away from an axis of a spool in a direction opposite a direction in which a fish line is delivered from the spool, and said finger placing member has a finger placing surface extending between the side boards for supporting a thumb for movement along said finger placing surface during a thumbing operation on the spool, said finger placing surface increasing in height from one end thereof to an opposite end thereof.

7. A double-bearing type fishing reel according to claim 6, wherein said finger placing surface is gradually larger in height toward one of said side boards, on which a handle is provided, from the other one of said side boards.

8. A double-bearing type fishing reel according to claim 6, wherein said finger placing surface is gradually larger in height from one of said side boards, on which a handle is provided, toward the other one of said side boards.

9. A double-bearing type fishing reel according to claim 6, wherein said finger placing surface is formed as a curved slope surface.

10. A double-bearing type fishing reel according to claim 6, wherein said finger placing surface is formed as a planar slope surface.

* * * * *